US008977769B2

(12) United States Patent
Gelter

(10) Patent No.: US 8,977,769 B2
(45) Date of Patent: Mar. 10, 2015

(54) SYSTEM FOR MANAGING LOSSLESS FAILOVER IN AN AUDIO-BRIDGING (AVB) NETWORK

(75) Inventor: Aaron Gelter, West Jordan, UT (US)

(73) Assignee: Harman International Industries, Incorporated, Northridge, CA (US)

( * ) Notice: Subject to any disclaimer, the term of this patent is extended or adjusted under 35 U.S.C. 154(b) by 157 days.

(21) Appl. No.: 13/351,732

(22) Filed: Jan. 17, 2012

(65) Prior Publication Data

US 2013/0185451 A1 Jul. 18, 2013

(51) Int. Cl.
*G06F 15/16* (2006.01)

(52) U.S. Cl.
USPC .......................................... 709/231; 709/232

(58) Field of Classification Search
USPC .......................................... 709/203, 230–234
See application file for complete search history.

(56) References Cited

U.S. PATENT DOCUMENTS 6,442,694 B1 * 8/2002 Bergman et al. ................ 726/22
7,440,430 B1 * 10/2008 Jagadeesan et al. .......... 370/331
7,548,995 B2 * 6/2009 Thukral .......................... 710/20
7,584,495 B2 * 9/2009 Hannuksela et al. ......... 725/101
2006/0085551 A1 * 4/2006 Xie et al. ...................... 709/231
2007/0237185 A1 10/2007 Pereira et al.
2008/0022340 A1 * 1/2008 Hannuksela et al. ......... 725/112
2008/0086570 A1 4/2008 Dey et al.
2008/0195744 A1 * 8/2008 Bowra et al. .................. 709/231
2008/0232243 A1 * 9/2008 Oren et al. .................... 370/216
2009/0034633 A1 * 2/2009 Rodirguez et al. ....... 375/240.28
2009/0172182 A1 * 7/2009 Yoon ............................. 709/231
2009/0201803 A1 * 8/2009 Filsfils et al. ................ 370/222
2010/0085868 A1 * 4/2010 Guo et al. ..................... 370/216
2011/0029684 A1 * 2/2011 Campana et al. ............. 709/231
2011/0090958 A1 * 4/2011 Sridhar et al. ........... 375/240.12
2011/0194837 A1 * 8/2011 Kishikawa et al. ........... 386/248
2011/0264966 A1 * 10/2011 Williams et al. ................ 714/49
2012/0163345 A1 * 6/2012 Camarillo et al. ............ 370/333
2013/0107699 A1 * 5/2013 Miclea .......................... 370/228

FOREIGN PATENT DOCUMENTS

WO WO 02/067120 A1 8/2002

OTHER PUBLICATIONS

IEEE Standard for Local and metropolitan area networks—"Virtual Bridged Local Area Networks", Amendment 14: Stream Reservation Protocol (SRP), IEEE Computer Society, IEEE Std. 802.1Qat, New York, NY, Sep. 30, 2010, pp. i-103.
European Search Report for corresponding EP Application No. 13151138.8 mailed Jun. 5, 2013.

* cited by examiner

*Primary Examiner* — Joshua Joo
(74) *Attorney, Agent, or Firm* — Alleman Hall McCoy Russell & Tuttle LLP

(57) ABSTRACT

A network communication system includes a listener that receives a plurality of data streams from a talker. The data in the data streams may be identical. The listener identifies one of the data streams as a primary data stream and another of the plurality of data streams as a non-primary data stream. The listener may process data in the primary data stream, and may buffer a minimal amount of data in the non-primary data stream. In the event of a failure or disruption in reception of the primary data stream, the listener may switch over to processing the data in the non-primary data stream. The switch over to processing the non-primary data may be performed in a manner that ensures lossless failover.

17 Claims, 6 Drawing Sheets

SYSTEM FOR MANAGING LOSSLESS FAILOVER IN AN AUDIO-BRIDGING (AVB) NETWORK

BACKGROUND OF THE INVENTION

1. Technical Field

This invention relates to an Ethernet Audio-Video Bridging ("AVB") network, and more particularly to communicating redundant data streams in the AVB network.

2. Related Art

Audio/video ("A/V") data may be transmitted in a network system from a source endpoint to a destination endpoint. The destination endpoint may include a media buffer, where the data is temporarily stored until it is processed and output as audio and/or video. In some situations, successful reception of the data may fail due to a disruption in transmission of the data, which may prevent some or all of the transmitted A/V data from being outputted as audio and/or video.

SUMMARY

A network communication system configured for lossless failover may include a talker that is configured to transmit a plurality of data streams to a listener. The plurality of data streams may include identical or matching data. Also, the plurality of data streams may be transmitted over separate physical paths, such as separate Ethernet cables and/or using separate intermediate bridges/switches. The listener may be configured to receive the plurality of data streams, and manage the data streams in such a way that ensures lossless failover.

The talker may reserve a plurality of paths in the network over which to transmit the plurality of data streams. To reserve the paths, the talker may send a plurality of stream advertisements. Each of the stream advertisements may include a unique and/or different stream ID, each corresponding to one of the plurality of data streams to be transmitted. The talker may receive one or more responses to the stream advertisements from the listener and in response, establish the paths. Additionally, the talker may generate the plurality of data streams. The talker may receive or generate the data, and may also duplicate the data. The talker may packetize the original and duplicate data into packets, and convert the packets of data into the plurality of data streams. Also, the talker may assign unique stream IDs to the plurality of data streams. The talker may then transmit the plurality of data streams over the plurality of reserved paths in the network.

The listener may receive the plurality of data streams and determine a primary data stream and one or more non-primary data streams among the received data streams. The listener may also determine whether there is a failure or disruption in the reception of the primary data stream. If the listener determines that there is not a failure or disruption, the listener may operate in a normal operation mode, in which the listener processes data in the primary data stream and buffers data in the non-primary data stream for a minimal and/or optimal amount of time to ensure lossless failover. The optimal and/or minimal amount of time may be determined based on a timeout period. The timeout period may be a period of time that may elapse before the listener determines that a failure or disruption in reception of the primary data stream has occurred. The timeout period may be offset when determining the minimal amount of time to buffer the data, depending on whether the primary data stream is received before or after the non-primary data stream. The listener may also track the data in the primary data stream that is sent for processing. The listener may identify sequence numbers associated with the data to perform the tracking. The listener may ignore or discard data in the secondary data stream that corresponds to the data in the primary data stream that is sent to be processed.

If the listener determines that the timeout period has elapsed, the listener may determine that a failure or disruption in reception of the primary data stream has occurred. In response to determining the failure or disruption, the listener may switch over to processing the data in the secondary stream. Because the listener has been tracking the sequence numbers in the data streams and buffering at least a minimum amount of the tracked data in the secondary data stream, no data transmitted from the talker may be lost despite the failure or disruption.

Other systems, method, features and advantages will be, or will become, apparent to one with skill in the art upon examination of the following figures and detailed description. It is intended that all such additional systems, method, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Demand for connectivity between network devices continues to increase at a fast rate. In many systems, a greater number of devices are being manufactured which have network connection and/or communication capabilities. For example, in some automobiles, components not previously considered connective are being manufactured with connective capabilities. Parts, such as brakes, throttle, and/or various other parts, may be manufactured as Ethernet Audio-Video Bridging ("Ethernet AVB") enabled devices which may communicate through an Ethernet AVB network. In some systems, Ethernet AVB networks may be used to connect one or more devices, with data streams being sent wirelessly and/or through a wireline, such as an Ethernet cable. The data streams may include data, such as audio, video, or both audio and video, as examples.

Figure 1:
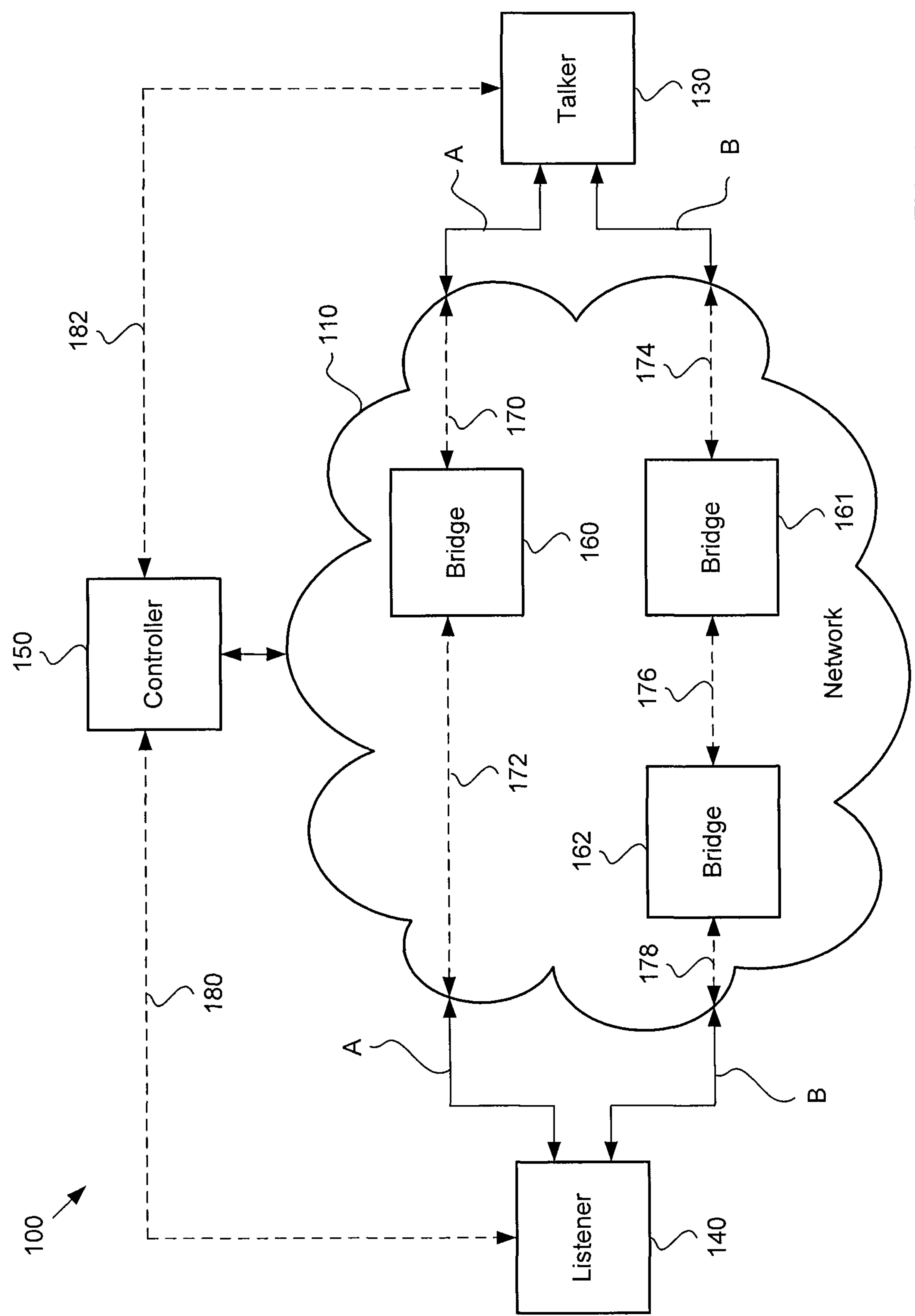
FIG. 1 is a block diagram of an example network communication system.

FIG. 1 illustrates an example network communication system 100 that may be configured for redundancy. The example network communication system may include a plurality of electronic devices, including electronic devices 130, 140, and 150. More or fewer electronic devices may be included. One or more of the electronic devices of the system 100, including the talker 130, the listener 140, and the controller 150, may be in communication with one or more of the other electronic devices over the network 110. In addition, each electronic device 130, 140, 150, may be configured to perform one or more roles. The roles may include the role of a talker, the role of a listener, the role of a controller, and/or any combination of these three roles.

The role of the talker may be to transmit information and/or data across the network 110. Alternatively or in addition, the role of the talker may be to establish, create, and/or reserve a connection for the transmission of a data stream carrying the information and/or data. Alternatively or in addition, the role of the talker may be to remove or tear down the connection. The role of the listener may be to receive the information and/or the data that has been sent over the network 110. Alternatively or in addition, the role of the listener may be to connect to and/or reserve connection to the data stream. Alternatively or in addition, the role of the listener may be to remove connection from the data stream.

The role of the controller may be to control the flow of the data stream between the talker and one or more of the listeners. The controller may control the flow of the data stream by sending one or more messages, such as command messages, to the talker and/or the listeners to create a connection and/or remove the connection of the data stream between the talker and the listeners. The messages may be communicated to the talker and/or the listeners through a high-level application layer of the talker and/or the listeners. In addition or alternatively, the role of the controller may be to determine a hierarchy of data streams that may be used to manage and/or process redundant data streams. Other roles may be included.

The electronic devices 130, 140, and/or 150 may be configured to switch between or change roles. For example, in one situation, one of the electronic devices may be configured to be a talker, and in another situation, the electronic device may be configured to be a listener. In yet another situation, the electronic device may be configured to be both a talker and a listener.

The electronic devices 130, 140, and/or 150 may be configured to perform different roles in different situations or at different times. For example, in one situation, one of the electronic devices may be configured to be a talker. In a different situation, that electronic device may be configured to be a listener. Alternatively, the roles that the electronic devices 130, 140, and/or 150 may be configured to perform may be fixed. For the following description, the electronic devices 130, 140, and 150 in the system 100 are designated the roles of the talker, the listener, and the controller, as previously described. The electronic device 130 is configured as the talker, the electronic devices 140 are configured as the listener, and the electronic device 150 is configured as the controller. In an alternative communication network system, other roles may be designated. In addition, in an alternative system, there may be more than the one talker 130, more than one listener 140, and/or more than the one controller 150. In still other examples, the same electronic device may perform as a talker or a listener while also being a controller.

The network 110 may be, include, and/or communicate through or with an Ethernet AVB network. The electronic devices in the communication system 100, including the talker 130, the listener 140, and/or the controller 150 may communicate over the network 100 using various protocols, such as protocols designated by the Institute of Electrical and Electronics Engineers (IEEE), including IEEE 802.1AS-2011 (gPTP) for network timing and synchronization, IEEE 802.1Qav-2009 for queuing and forwarding streaming data, IEEE 802.1Qat-2010 (Stream Reservation Protocol (SRP)) for reserving data stream bandwidth in a network, and/or IEEE 1722-2011 related to a possible data streaming format. Various other protocols may be used. Alternatively or additionally, the network 110 may be, include, and/or communicate through or with wide area networks (WAN), such as the Internet, local area networks (LAN), campus area networks, metropolitan area networks, or any other wireless and/or wireline networks that may allow for data communication. The network 110 may be divided into sub-networks. The sub-networks may allow access to all of the components connected to the network 110, or the sub-networks may restrict access between the components connected to the network 110. The network 110 may be regarded as a public or private network and may include, for example, a virtual private network, an encryption, or any other security mechanism employed over the public Internet, or the like. Various other types of networks 110 are possible.

One or more of the talker 130, the listener 140, and/or the controller 150 may be connected to the network 110, such as an Ethernet AVB network, in any configuration that supports data transfer. This may include a data connection to the network 110 that may be wired or wireless. One or more of the talker 130, the listener 140, and/or the controller 150 may be connected to the network 110 and/or to each other through or with an Ethernet connection, such as using a cable or wireless connection to an Ethernet AVB network. Various other connections may be possible.

The talker 130 may be configured, adapted, operable, and/or enabled to send information and/or data through the network 110. For example, the talker 130 may be configured and/or adapted to send one or more streams of information that includes data, commands, and/or command signals through, using, or across an Ethernet AVB network. As described in more detail below, the talker 130 may be configured and/or adapted to send two or more streams that are identical, partially identical, and/or in which some or all of the data, commands, and/or command signals included in the two or more streams are identical. Information and/or data sent by the talker 130 through the network 110, such as through an Ethernet AVB network, may be received by other devices connected with the network 110, such as the listener 140 and/or the controller 150.

The talker 130 may transmit, send, output, and/or advertise processed information and/or data to the network 110, such as in, with, and/or using one or more data streams and/or one or more Ethernet AVB signals. For example, the talker 130 may advertise one or more data streams encompassing data related to music played by a user on a device (e.g., a MPEG-1 or MPEG-2 Audio Layer III (MP3) player or an electronic musical keyboard) connected with the talker 130 onto an Ethernet AVB network. The information and/or data advertised by the talker 130 on the network 110 may be received by other devices, such as by the listener 140, and/or the controller 150.

The talker 130 may have one or more talker attributes. A talker attribute may specify, include and/or otherwise identify characteristics about the talker 130 and/or a data stream advertised by the talker 130. One talker attribute may include multiple pieces of information and/or data. The talker attribute may include, identify, specify, and/or be related to a single piece of information and/or data, and the talker 130 may have multiple talker attributes. Alternatively, the talker attribute may include, identify, specify, and/or be related to multiple pieces of information and/or data, and the talker 130 may have only a single talker attribute. Various combinations are possible.

The talker attribute may indicate and/or advertise that the talker 130 may have a data stream, such as audio, video, and/or command data streams, that the talker 130 may multicast over the network 110. In addition or alternatively, the talker attribute may indicate how much bandwidth the data stream advertised by the talker 130 may require in order to be transmitted through the network 110. The amount of bandwidth specified may be used by bridges and/or switches in the network 110 to determine if there is enough bandwidth capability to reserve the amount of bandwidth at each switch in the path between the talker 130 and the listener 140. In one example, the listener 140 may not be concerned with the amount of bandwidth because one or more of the switches and/or bridges may indicate a failure due to bandwidth constraints before the listener receives bandwidth information specified in the attribute.

In addition or alternatively, a talker attribute may specify a destination address to which to send the data stream. The destination address may identify one or more particular listeners, such as the listener 140. Where only one listener, such as listener 140 is known and/or identified, the destination address may be a unicast address. Alternatively, the destination address may be a multicast destination address that is used to identify multiple listeners (e.g., where there are more listeners than listener 140 in the system 100). In addition or alternatively, a multicast destination address may be used where there is single listener (e.g., listener 140) in the system, with the assumption that more and/or other listeners may be added to the system 100 at a later time. In addition or alternatively, the talker 130 may broadcast a stream, which may allow any device in the system to listen. In some situations, broadcasting a stream may not be desirable and/or recommended because it may require all paths in the system 100 to have reservations, which may needlessly increase traffic.

In addition or alternatively, the talker attribute may specify a unique stream identifier ("ID") for a data stream advertised by the talker 130. The stream ID may be a unique sequence of characters and/or numbers which may only be assigned to one stream. In some systems, no two streams may have the same stream ID. The unique stream ID may be a 64 bit stream ID, or various other stream IDs may be used. An assignment and/or identification of the stream ID may be used and/or performed by devices, such as the listener 140, to identify a stream for which the device wants to attach itself. For example, the listener 140 may receive over the network 110 a message, such as an advertisement, that includes a unique stream ID and may, based on the identification of the stream ID, request attachment, such as connection, to the stream associated with the stream ID. Various other uses of the stream ID are possible. The talker 130 may be configured to assign the stream ID to the stream at a time that the talker 130 is manufactured, such as by a manufacturer, after manufacture, such as at a time that the talker 130 connects with the network 110, and/or at various other times. Alternatively or in addition, a talker attribute may include a propagation delay from the talker 130 to one of the listeners 140. The propagation delay may include an "on the wire" delay or latency between the talker 130 and one of the listeners 140. "On the wire" delay may be a time that the data stream takes to be communicated between electronic devices, including the time between being transmitted by one electronic device and being received by another electronic device. The "on the wire" delay may include the time that the data stream takes to be communicated between a talker and a bridge, a listener and a bridge, and/or between bridges. The propagation delay may also include a delay or latency from an ingress port to an egress port of one or more bridges in the network 110.

One or more talker attributes may be stored in the talkers 130, the listener 140, and/or the controller 150. For example, a unique stream ID of the talker 130 may be sent to and/or received by the controller 150, which may record and/or store the unique stream ID of the talker 130 and/or forward the unique stream ID of the talker 130 to the listener 140. The talker attributes may or may not be sent through, with, or using a non-SRP protocol. Various other uses and functions of talker attributes are possible.

Before transmitting the data stream, the talker 130 may advertise that the talker 130 wants to transmit the data stream over the network 110 and/or reserve a path over the network 110 between the talker 130 and the listener 140. Where the talker 130 wants to transmit two data streams (e.g., two data streams having identical data), the talker 130 may send out two advertisements, one for each data stream and/or one for each path to be reserved for transmission of the data streams. Alternatively, the talker 130 may advertise that the data stream is unable to be transmitted to the listener 140. To advertise over the network 110, the talker may transmit a stream advertisement for each data stream to be transmitted. The stream advertisement may be a signal and/or other transmission from the talker 130 which may be passed through the network 110. A stream advertisement may indicate that the talker 130 has a data stream that it can, cannot, will, or will not send, multicast, and/or otherwise transmit over the network 110. The stream advertisement may include a Talker Advertisement ("TA") or a Talker Failed ("TF"). The TA may be an advertisement for a stream that has not encountered any bandwidth or other network constraints along the network path from the talker. The TF may be an advertisement for a data stream that is not available to the listener 140 because of bandwidth constraints or other limitations somewhere along the path from the talker 130. In some situations, if a bridge or switch along a path from the talker to listener does not have sufficient bandwidth or resources available, the bridge or switch may change the TA message to a TF message before forwarding it toward the listener 140.

The stream advertisement may include details about the data stream, such as one or more talker attributes that may be sent with and/or included in a stream advertisement advertised and/or output by the talker 130. For example, the stream advertisement may include the stream ID of the data stream being advertised by the talker 130. The stream advertisement may be transmitted across the network 110 to and/or received by the listener 140. In addition, the stream advertisement may include the propagation delay from the talker 130 to the listener 140.

The listener 140 may receive the stream advertisement. If the listener 140 wishes to receive the data stream being advertised by the TA, the listener 140 may send a response message, such as a Listener Ready ("LR") message, over the network 110 and/or to the talker 130. The signal may be a request to attach to the data stream via the stream ID, which may be included in the stream advertisement. When a bridge or switch in the AVB network 110 receives the LR from the listener 140, the bridge may match the LR with the TA and allow the data stream referenced by the stream advertisement to be sent to the requesting listener 140. The listener 140 may attach to more than one data stream via the stream IDs of each requested data stream. Other variations are possible.

The listener 140 may have one or more listener attributes or listener properties. The listener attributes or properties may or may not contain a single piece of information, such as a stream ID that the listener 140 may want to attach to. One or more listener attributes or properties may be sent with, through, and/or using the network 110. One or more listener attributes or properties may be sent to, accessed by, and/or received by one or more receiving devices on the network 110, such the talker 130 and/or the controller 150. One or more listener attributes or properties may be stored in one or more of the talker 130, the listener 140, and/or the controller 150. One or more listener attributes or properties may be used to connect the listener 140 with a data stream and/or the talker 130. Various other uses and functions of listener attributes or properties are possible.

The listener attributes or properties may specify, include, and/or otherwise identify characteristics about the listener 140. Listener attributes or properties may, for example, exist and/or be used outside of a stream reservation protocol stack within the talker 130 or the listener 140, and/or may be used to inform devices on the network 110 about the attributes or properties of one or more of the listeners 140. For example, a listener attribute or property may specify what talkers (e.g., the talker 130) that one or more of the listeners (e.g., the listener 140) may be interested in. A listener attribute or property may include the stream ID. A listener attribute or property may identify one or more capabilities of the listeners 140, such as bandwidth that the listener 140 has available, a type of data stream that the listener 140 may be interested in and/or capable of processing, and/or various capabilities of the listener 140. A listener attribute or property may additionally or alternatively specify various other pieces of information and/or data about the listener 140. One listener attribute may include multiple pieces of information and/or data. In some systems, each listener attribute may be related to only one piece of information and/or data, and the listener 140 may have multiple listener attributes. In other systems, the listener 140 has only one listener attribute which specifies multiple pieces of information and/or data about the listener 140. The listener attributes may exist and/or be used within or outside of SRP and/or may include some or all of the listener attributes or properties described. Various combinations are possible.

The listener 140 may respond to a stream advertisement sent by the talker 130. The response message may be, for example, a Listener Ready (LR), a Listener Ready Failed (LRF), and/or a Listener Asking Failed (LAF) message. As previously described, the LR message may indicate that the listener 140 is requesting attachment to the data stream, and that there is sufficient bandwidth and/or resources along one or more paths to the talker 130 for the listener 140 (or in alternative systems for all of a plurality of listeners) to receive the data stream. Where there are a plurality of listeners, the LRF message may indicate that more than one of the listeners are requesting attachment to the data stream, and that one of the listeners has sufficient bandwidth and/or resources along the path to receive the data stream, but one or more of the listeners is unable to receive the data stream because of network bandwidth and/or resource allocation problems. The LAF message may indicate that one or more of the listeners are requesting attachment to the data stream, but that none of the listeners are able to receive the data stream because of network bandwidth and/or resource allocation problems. One or more of the listener attributes may be included in the LR message, the LRF message, and/or the LAF message. The talker 130 may receive the response message, and in response to receiving the message, the talker 130 may reserve and/or establish a path to the listener 140 and/or send the data stream to the listener 140. Where the talker 130 sends multiple (e.g., two) advertisements to reserve multiple paths, the talker 130 may receive multiple response messages in response to the multiple advertisements, and in response, may reserve and/or establish multiple paths to the listener 140 and/or send the multiple data streams to the listener 140.

The network 110 may include one or more bridges which may communicate with one or more of the talker 130, the listeners 140, and/or the controller 150 communicating through and/or connected with the network 110. The example network communication system 100 shown in FIG. 1 includes three bridges 160, 161, 162, although other numbers of bridges may be included. The bridges 160, 161, 162 may communicate with the network 110 and/or the devices 130, 140, and/or 150. Paths may be established within the network 110 that connect the bridges 160, 161 together and/or that connect the bridges 160, 161 with the talker 130, with the listener 140, with the controller 150, with talker 130 and the listener 140, with the talker 130 and the controller 150, with the listener 140 and the controller 150, and/or combinations thereof. As examples, a path 170 may be established that connects the talker 130 with the bridge 160, a path 172 may be established that connects the bridge 160 to the listener 140, a path 174 may be established that connects the talker 130 with the bridge 161, a path 176 may be established that connects the bridge 161 with the bridge 162, and a path 178 may be established that connects the bridge 162 with the listener 140. One or more of the paths 170-178 may be removed, torn down, and/or re-established (as denoted by the dotted lines) to remove and/or re-establish communication between the talker 130 and the listener 140. In addition or alternatively, other paths may be established, removed, torn down, and/or re-established in the network 110 to establish connection between one or more of the talker 130, the listener 140, and the controller 150, and/or between the bridges 160, 161, and/or 162.

The bridges 160, 161, 162 may be connected to the network 110 through or using the various protocols, such as protocols designated by the IEEE, such as the Ethernet AVB. For example, the bridges 160, 161, 162 may communicate with the network 110 and/or the devices 130, 140, 150 connected to the network 110 through or using Ethernet AVB protocols such as IEEE 802.1AS-2011 (gPTP), IEEE 802.1Qav-2009, IEEE 802.1Qat-2010 (SRP), and/or IEEE 1722-2011. The bridges 160, 161, 162 may communicate using other protocols.

The example network communication system 100, including the talker 130, the listener 140, and/or the controller 150, may be configured for redundancy and/or be configured to communicate, manage, and/or process redundant data streams. By being configured for redundancy, the talker 130 may be configured to transmit multiple data streams containing identical or partially identical information, and the listener 140 may be configured to switch between processing (e.g., outputting the data via a media buffer) data received in one path to processing data received in another path. The listener 140 may be configured to switch from processing data received in one path to processing data received in another path in the event or presence of a disruption in communication in one of the paths, and may process the data in a lossless manner, i.e., without dropping or otherwise failing to process any of the transmitted data due to the disruption.

To be configured for redundancy, the talker 130 may be configured to transmit a plurality of data streams, with each data stream transmitted on a separate path. In the example network communication system 100 shown in FIG. 1, the talker 130 is configured to transmit two data streams along two separate paths to the listener 140, a first data stream along path A and a second data stream along path B. The paths A and B may depend on a configuration of the bridges in the network. For example, in FIG. 1, path A may include the path 170 from the talker 130 to the bridge 160 and the path 172 from the bridge 160 to the listener 140, and path B may include the path 174 from the talker 130 to the bridge 161, the path 176 from the bridge 161 to the bridge 162, and the path 178 from the bridge 162 to the listener 140. Other configurations of path A and/or path B are possible depending on the configuration of the network 110.

After two stream reservations are made between the talker 130 and the listener 140 to communicate two data streams from the talker 130 to the listener 140, the talker 130 may be configured to generate the data streams. The talker 130 may be configured to generate one of the data streams as a first data stream and transmit the first data stream along path A. The talker 130 may also be configured to generate a duplicate of the data first stream, or a data stream having matching data, and transmit the duplicate data stream as the second data stream along path B. The first data stream may be identical or at least partially identical to the second (i.e., duplicate) data stream. For example, the data, which may be configured as packets of data, may be identical between the first and second data streams. Also, sequence numbers indicating a sequence or order in which the packets are arranged or organized and/or samples within one or more packets are arranged or organized, may be identical between the first and second data streams. For example, a packet from the first data stream having a sequence number n may contain the same data samples as the packet in the second data stream having the sequence number n. Additionally, the first data stream and the second data stream may comprise some information that is different between the data streams. For example, a stream ID for the first data stream may be different than a stream ID for the second data stream. The stream ID for the first data stream may correspond to and/or be associated with a port and/or interface of the talker 130 used to transmit the first data stream along path A, and/or may correspond to and/or be associated with a port and/or interface of the listener 140 used to receive the first data stream from path A. Similarly, the stream ID for the second data stream may correspond to and/or be associated with a port and/or interface of the talker 130 used to transmit the second data stream along path B, and/or correspond to and/or be associated with a port and/or interface of the listener 140 used to receive the second data stream from path B. In some examples, the talker 130 may be configured to transmit the first data stream and the second data stream simultaneously, concurrently, or substantially simultaneously or substantially concurrently. At a minimum, the talker 130 may be configured to schedule transmission of the first and second data streams so that the talker 130 does not transmit two packets in one of the data streams before the talker 130 transmits one packet in the other data stream. To illustrate, audio stream packets may be sent at a rate of 8 kHz, or one packet every 125 microseconds. If the talker 130 transmits a packet in the first audio stream, then the talker 130 may be configured to send a packet in the second audio stream before the 125 microseconds elapses and another packet in the first audio stream is sent.

The first data stream and the second data stream may be transmitted along paths A and B, respectively, over the network 110 and/or received by the listener 140. The listener 140 may be configured to receive the first and second data streams. The listener 140 may further be configured to determine and/or identify the first data stream or the second data stream as a primary data stream and the other data stream as a secondary data stream. The primary data stream may be the data stream that the listener 140 is configured to process instead of the secondary data stream. The secondary data stream may be the data stream that the listener 140 is configured to buffer and subsequently either discard if the listener 140 processes the corresponding data in the primary data stream, or to process in the event of a disruption in receipt of the primary data stream and the listener 140 determines that it is unable to process the corresponding data in the primary data stream. In some examples, the listener 140 may also be configured to switch the designations of the primary and secondary data streams. To illustrate, the first data stream may be initially designated as the primary data stream and the second data stream may be initially designated as the secondary data stream. Upon a disruption in receipt of the primary data stream, the listener 140 may be configured to change the designation of the second data stream from being the secondary data stream to the primary data stream, and may also be configured to change the designation of the first data stream from being the primary data stream to the secondary data stream. The listener 140 may then process the second data stream as the primary data stream. In addition or alternatively, the listener 140 may be configured to maintain the identities of the first and second data streams as the primary and the secondary data streams, respectively, even if the listener 140 begins processing the secondary data stream, and may also be configured to switch back to processing the primary data stream in the event that reception of the primary data stream resumes.

The listener 140 may be configured to determine and/or identify the first data stream or the second data stream as the primary data stream and the other as the secondary data stream using a hierarchy and/or priority information. The listener 140 may be preconfigured with the hierarchy and/or priority information. In addition or alternatively, the listener 140 may be configured to determine and/or modify the hierarchy and/or priority information by using information, such as latency information, included in received data streams and/or stream advertisements. The listener 140 may be configured to store the determined and/or modified information in memory, either locally or remotely. In addition or alternatively, the listener 140 may be configured to determine hierarchy and/or priority information and/or instructions by receiving the information and/or instructions from the controller 150. The listener 140 may be configured to receive the hierarchy and/or priority information and/or instructions sent by the controller 150 from over the network 110, or alternatively, through wired or wireless non-network connections between the listeners 140 and the controller 150, as denoted by dotted arrow 180.

The hierarchy and/or priority information and/or instructions may be determined in various ways and/or based on various information. In one example, the hierarchy and/or priority information and/or instructions may be based on buffer allocation requirements. The data stream that is designated as primary and the data stream that is designated as secondary may be determined based on which designations yield the least amount of buffer memory allocation. In some situations, designating the data stream that is received first by the listener 140 as the primary and the data stream that is received second by the listener 140 as the secondary may yield the least amount of buffer memory allocation. To illustrate, memory may be allocated to buffer the secondary data stream until the secondary data stream is no longer needed for redundancy (e.g., until the listener 140 processes the corresponding data in the primary stream). Accordingly, designating as primary the data stream that is received by the listener 140 first and designating as secondary the data stream that is received by the listener 140 second may minimize the buffer memory needed to buffer the secondary data stream. Conversely, if the data stream that arrives last is designated as the primary and the data stream that arrives first is designated as the secondary, memory allocation may not be minimized because more buffer memory may be needed to buffer the secondary data stream while waiting for the primary data stream to arrive. In other situations, designating the data stream that arrives second (or last) as the primary and the data stream that arrives first as the secondary may yield the least amount of buffer memory allocation. To illustrate, in some systems that have multiple listeners, the listeners may be required to process (e.g., present) the data simultaneously. In those systems, the data may not be presented until all of the listeners receive the data stream. The listener that receives the data stream last may be required to allocate the least amount of buffer memory before the listeners present the data. Similarly, the listener that receives the data stream first may allocate the most amount of buffer memory before presenting the data. In these situations, designating the data stream that arrives last as the primary data stream may minimize the amount of memory allocated in the system for the data to be presented simultaneously by the listeners in the system.

The order in which the primary and data streams are received by the listener 140 may be determined based on the latency in path A and path B. The data stream being transmitted along the data path having the least amount of latency may be received first. Likewise, the data stream being transmitted along the path having the greatest latency may be received last. In some situations, the latency in path A and/or path B may be based on the number of bridges in the path. The more bridges that the data stream passes through (or bridge hops that the data stream undergoes), the greater the latency there may be between the talker 130 and the one of the listeners 140, 141. To illustrate, in FIG. 1, path A may have less latency than path B because path A includes one bridge, the bridge 160, whereas path A includes two bridges, the bridge 161 and the bridge 162.

In another example, the primary and secondary data streams may be determined based on statistical information maintained by the talker 130, the listener 140, the controller 150, and/or other components in the network communication system 100. The statistical information may include failure information, such as a number of times that receipt of data by the listener 140 failed and/or that path A and/or path B has failed over a particular time frame. A failure may occur when data intended to be received by the listener 140 is not received by the listener 140. The failure may be caused by problems in the network 110, such as a switch or a bridge in the network 110 malfunctioning so that the switch or bridge is no longer forwarding the data over the network 110. Alternatively, the failure may be due to a problem with network operating under one or more protocols, such as the AVB protocols. For example, a failure may occur where reservations for data paths are made where reservations should not be made. Alternatively, the failure may be due to problems in the transmission lines, such as an Ethernet cable transmitting the data malfunctioning or becoming inoperable or defective. Additionally, a failure may be due to data being corrupted. The talker 130 and the listener 140 may be configured to communicate in compliance with a predetermined bit error rate (BER). That is, the data streams being communicated do not exceed the predetermined BER. The system 100 may be configured so that the listener 140 does not receive data streams having corrupted data, whether the data stream exceeds the BER or not. For example, the system 100 may be configured to use cyclic redundancy check (CRC) so that a data stream having corrupted data detected by the CRC is not received by the listener 140. Other factors that may cause data to not be received by the listener 140 are possible. Based on the statistical information, one or more of the components in the system, such as the controller 150 and/or the listener 140, may determine which of path A and path B is least likely to fail. Based on the statistical information, the listener 140 may be configured to identify the data stream arriving on the path least likely to fail as the primary data stream.

In other examples, if no hierarchy and/or priority information and/or instructions are available, the listener 140 may be configured to arbitrarily choose one of the first and second data streams as the primary data stream, and the other as the secondary data stream.

Figure 2:
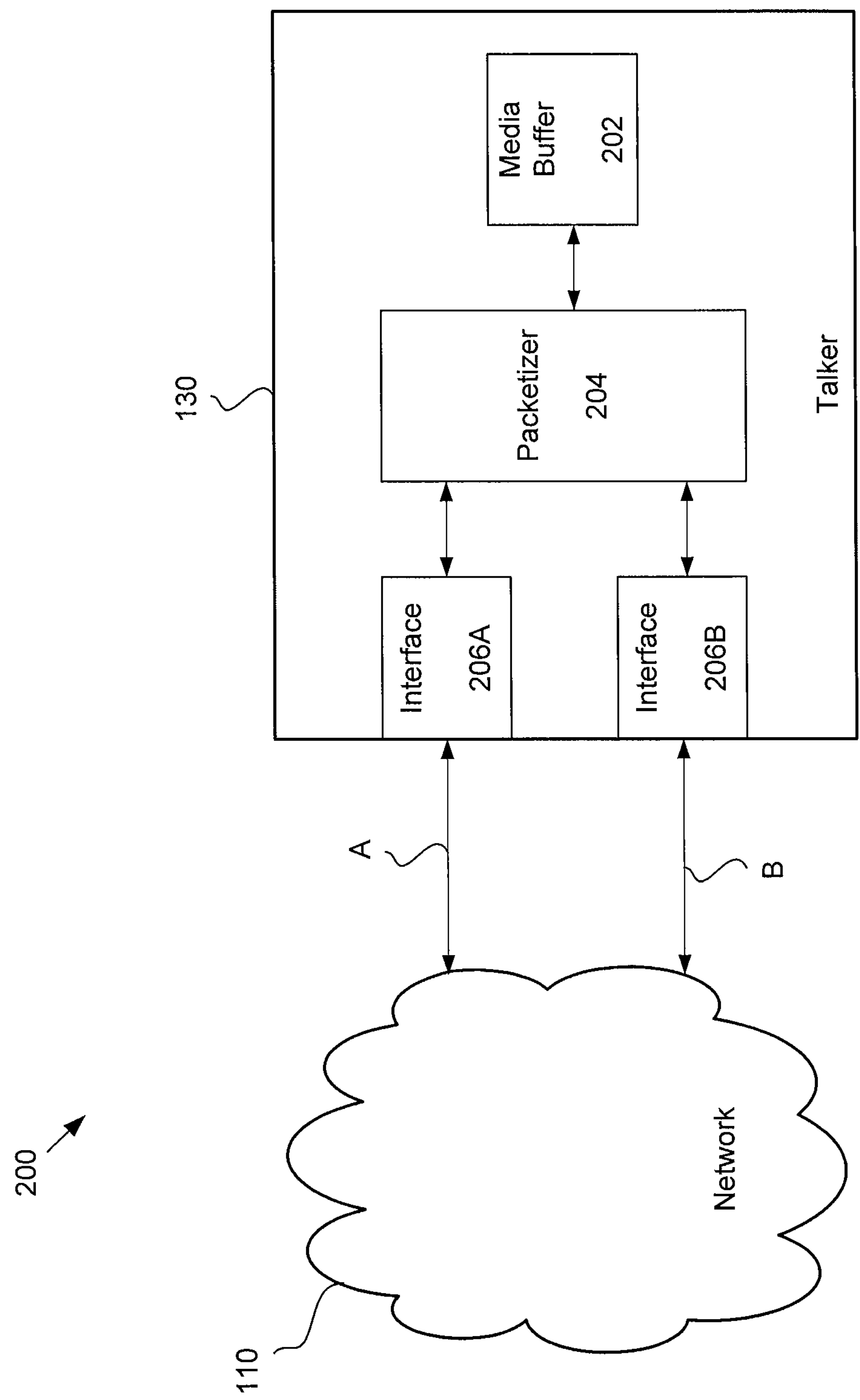
FIG. 2 is a block diagram of an example talker of the network communication system of FIG. 1.

FIG. 2 shows the example talker 130 of the network communication system 100 in further detail. The talker 130 may include a media buffer 202. The media buffer 202 may be configured to buffer data, such as audio data and/or video data, that is to be transmitted in the data streams over the network 110. The media buffer 202 may be in communication with a packetizer 204, and may be configured to buffer the data until the packetizer 204 is able to packetize the data into packets. The packetizer 204 may be configured to receive the data from the media buffer 202 and format the received data into packets, or another format that is suitable for transmission over the network 110. The packetizer 204 may also be configured to assign sequence numbers to the packets and/or individual samples within the packets that indicate the order in which the packets and/or samples are to be processed by the listener 140. In addition, the packetizer 204 may be configured to duplicate the data received from the media buffer 202. In other example systems, the packetizer 204 may receive both the original data and the duplicated data from the media buffer 202, and may be configured to packetize the original data and the received duplicated data. The packetizer 204 may also be configured to packetize the duplicated data into data stream packets, or alternatively format the duplicated data into a format that is suitable for transmission over the network. In addition, the packetizer 204 may be configured to assign sequence numbers to the duplicated packets and/or to the individual samples. The sequence numbers assigned to the duplicated packets and/or samples in the duplicated packets may correspond to the sequence numbers assigned to the data stream packets and/or samples containing the original data.

In addition, the packetizer 204 may be configured to convert the data stream packets containing the original data into a first data stream. The packetizer 204 may also be configured to assign a first stream ID to the first data stream. The first stream ID may correspond to the stream ID used to establish the stream reservation between the talker 130 and the listener 140 along path A. Likewise, the packetizer 204 may be configured to convert the data stream packets containing the duplicated data into a second data stream. The packetizer 204 may assign a second stream ID to the second data stream. The second stream ID may correspond to the stream ID used to establish the stream reservation between the talker 130 and the listener 140 along path B. After the first and second data streams have been generated, the packetizer 204 may be configured to send the data streams to first and second interfaces 206A, 206B for transmission over the paths A and B. The packetizer 204 may send the first and second streams to the first and second interfaces 206A, 206B based on the stream IDs corresponding to the stream reservations that were established for paths A and B. The packetizer 204 may determine which data streams to send to which of the interfaces 206A, 206B by associating the interfaces 206A, 206B with one of the stream IDs and the other of the interfaces 206A, 206B with the other of the stream IDs. The packetizer 204 may then send the first and second data streams to the first and second interfaces 206A, 206B based on the association. To illustrate, as an example, path A may be reserved for the data stream having the first stream ID (i.e., the first data stream) and path B may be reserved for the data stream having the second stream ID (i.e., the second stream ID). The packetizer 204 may determine to associate the first stream ID with the first interface 206A, and the second stream ID with the second interface 206B. Accordingly, the packetizer 204 may be configured to send the first data stream having the first stream ID to the first interface 206A and send the second data stream having the second stream ID to the second interface 206B.

Each of the first and second interfaces 206A, 206B may be configured to receive one of the data streams. In addition, each of the first and second interfaces 206A, 206B may be in communication with one path A or path B and configured to transmit the received data stream along their respective paths. As shown in FIG. 2, the first interface 206A may be configured to transmit one of the first or second data streams over path A in the network 110, and the second interface 206B may be configured to transmit the other of first or second data streams over path B in the network 110. The first interface 206A and the second interface 206B may be configured to transmit the first and second data streams simultaneously or substantially simultaneously over paths A and B, as previously described. In one example, the talker 130 may have parallel transmission capabilities, such as where the talker 130 is configured and/or implemented using an integrated circuit such as a field programmable gate array (FPGA), to transmit the first and second data streams simultaneously or substantially simultaneously. Alternatively, the talker 130 may be configured and/or implemented using sequential processing in which a single packet from either the first data stream or the second data stream is transmitted at a given time.

Each of the interfaces 206A, 206B may comprise a physical layer (PHY) that connects a link layer device (e.g., a media access control (MAC)), to a physical medium, such as Category (Cat) 5 (e.g., an Ethernet), fiber optic, or copper cables, which may comprise the physical media for paths A and B over the network 110. The interfaces 206A, 206B may also comprise magnetics, such as isolating transformers to isolate noise from the network 110, and/or connectors (e.g., Ethernet connectors, etc.) that may be used to connect the physical media and the PHY. Other components and/or circuitry may be used.

Figure 3:
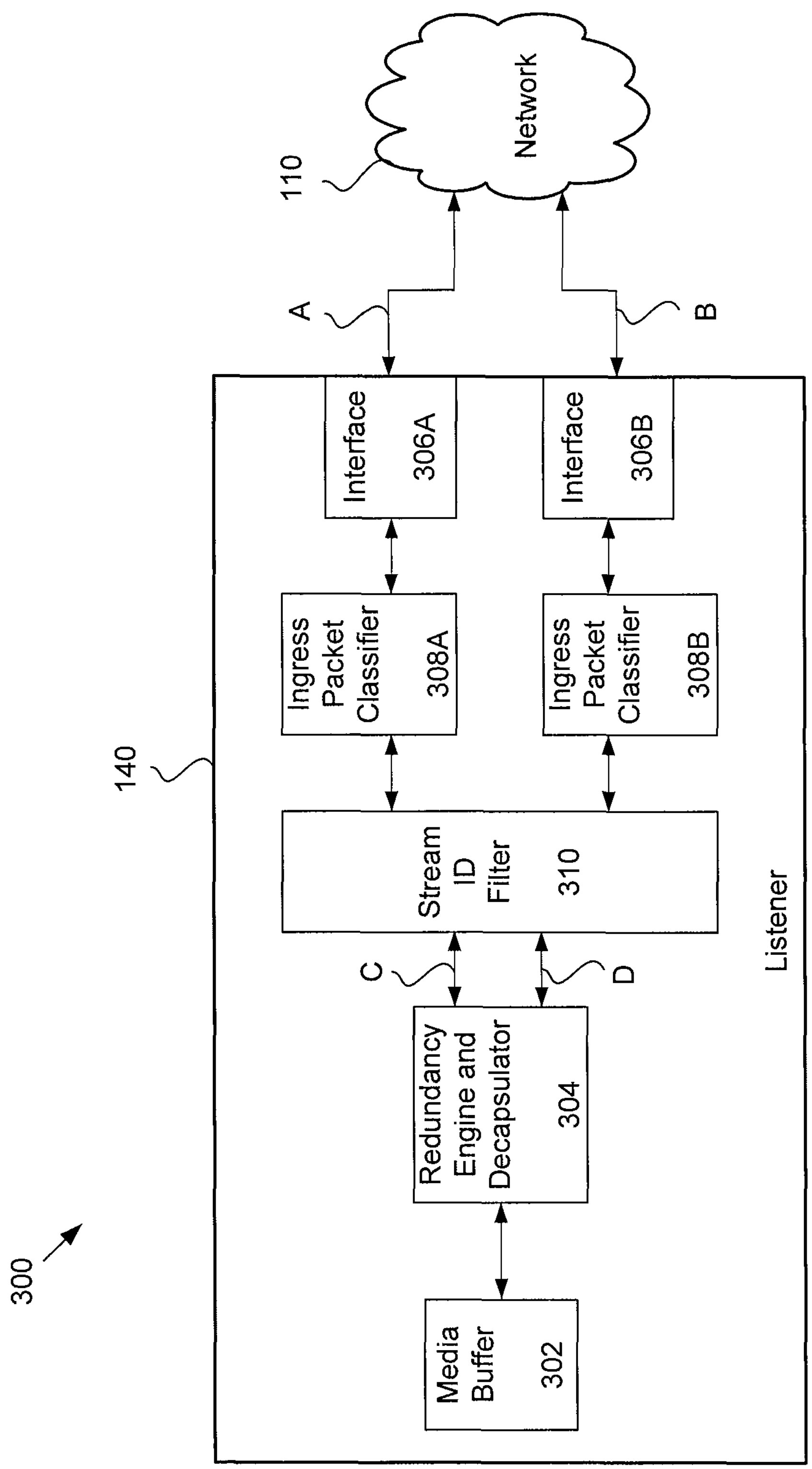
FIG. 3 is a block diagram of an example listener of the network communication system of FIG. 1.

FIG. 3 shows the example listener 140 of the network communication system 100 in further detail. The listener 140 may include first and second interfaces 306A, 306B that are configured to receive the first and second data streams from paths A and B. Like the interfaces 206A, 206B of the talker 130, the interfaces 306A, 306 may each include a PHY that receives the first or second data streams from the physical media comprising paths A and B, and communicates the first or second data stream to a MAC. The interfaces 306A, 306B may also include magnetics and/or connectors to communicate the data streams received on the physical media to the PHYs.

The listener 140 may further include a first ingress packet classifier 308A in communication with the first interface 306A and a second ingress packet classifier 308B in communication with the second interface 306B. The first interface 306A may be configured to send, such as through the MAC, the data stream that it receives to the first ingress packet classifier 308A. Similarly, the second interface 306B may be configured to send, such as through the MAC, the data stream that it receives to the second ingress packet classifier 308B. Each of the first and second ingress packet classifiers 308A, 308B may be configured to identify and/or inspect the incoming packets of the data streams and classify the packets as to their type, such as data stream, timing (e.g., Precision Time Protocol (PTP)), or best effort (legacy) Ethernet, as examples. The first and second ingress packet classifiers 308A, 308B may be configured to differentiate between the different types and/or send the packets to the appropriate modules and/or engines that process the packets. For example, the ingress packet classifiers 308A, 308B may be configured to send packets identified as data stream packets to a stream ID filter 310 (as described in more detail below), packets identified as timing packets to a timing module (not shown), and packets identified as best effort (legacy) Ethernet packets to a standard Ethernet stack. After identifying and/or inspecting the received packets, the first ingress packet classifier 308A and the second ingress packet classifier 308B may be configured to send the packets identified and/or classified as data stream packets to the stream ID filter 310.

The stream ID filter 310 may be configured to receive the data stream packets from the first and second ingress packet classifiers 308A, 308B. The stream ID filter 310 may further be configured to compare the stream IDs associated with the received data stream packets with known stream IDs and acceptable for and/or desirable by the listener 140 to process. The known stream IDs may be configured as a list or a look up table, and/or may be determined when establishing the stream reservations to receive the first and second data streams. In addition or alternatively, the stream ID filter 310 may receive the known stream IDs from the controller 150. If, for each data stream packet, the stream ID associated with the data stream packet matches one of the known stream IDs, then the stream ID filter 310 may be configured to pass the data stream packet to a redundancy engine and decapsulator 304. Alternatively, if the stream ID of the data stream packets do not match the known stream IDs (i.e., the stream ID is not known to the stream ID filter 310), then the data stream packets having the unknown stream ID are dropped and not passed to the redundancy engine and decapsulator 304. An example situation where an incoming stream may have an unknown stream ID may be where a "rogue" talker or other transmitting device broadcasts a stream without a reservation or sends a stream before a reservation has been made. The stream ID filter 310 is configured to prevent these unknown streams from being processed downstream, for example by the redundancy engine and decapsulator 304.

In one example, the stream ID filter 310 may be configured to pass the data stream packets with known stream IDs on two different and/or separate paths C and D. For example, assuming that data stream packets in the first and second data streams have stream IDs that are known to the stream ID filter 310, then the stream ID filter 310 may be configured to pass the first data stream on one of the paths (e.g., path C) and pass the second data stream on the other path (e.g., path D). The stream ID filter 310 may be configured to output the different data streams on different and/or separate paths because the stream ID filter 310 may not be configured to decide which data stream will be used in subsequent processing (e.g., by the redundancy engine and decapsulator 304). Rather, the stream ID filter 310 may be configured to pass packets having known stream IDs, and pass them without knowing which of the packets will be used by the redundancy engine and decapsulator 304. In other example configurations, the packets having known stream IDs may be sent to the redundancy engine and decapsulator 304 on a single path, for example by using an interleaving procedure. Alternatively more than two paths may be used. In addition or alternatively, the number of paths that are used to pass the data stream packets having known stream IDs from the stream ID filter 310 to the redundancy engine and decapsulator 304 may be proportional and/or equal to the number of known stream IDs. Various configurations are possible.

The redundancy engine and decapsulator 304 may be configured to receive the data stream packets sent from the stream ID filter 310 and may identify the packets as being data stream packets of a primary data stream or a secondary data stream. The redundancy engine and decapsulator 304 may identify which of the data streams is the primary data stream and which is the secondary data stream based on memory allocation requirements, latency determinations, information included in the data streams, statistical information, arbitrarily, or other ways or information as previously described, and/or as provided by the controller 150.

The redundancy engine and decapsulator 304 may further be configured to determine whether there is a failure or a disruption in reception of the primary data stream. If the redundancy engine and decapsulator 304 does not identify a failure, then the redundancy engine and decapsulator 304 may operate in a normal operation mode. In the normal operation mode, the redundancy engine and decapsulator 304 may be configured to send the data in the primary data stream to a media buffer 302, where they may be buffered before being processed (e.g., output as video and/or audio). Additionally, the redundancy engine and decapsulator 304 may be configured to discard or ignore the data in the secondary data stream that corresponds to the data in the primary stream sent to the media buffer 302.

Alternatively, if the redundancy engine and decapsulator 304 determines that a failure or disruption in the primary data stream has occurred, then the redundancy engine and decapsulator 304 may be configured to enter into a failure operation mode. In the failure operation mode, the redundancy engine and decapsulator 304 may be configured to switch to sending the data in the secondary data stream to the media buffer 302. In addition or alternatively, in the event of a failure or disruption in the primary data stream, the redundancy engine and decapsulator 304 may be configured to designate the secondary data stream as the primary data stream. Because reception of the primary data stream has failed, the system 100 is no longer configured for redundancy because the listener is no longer receiving two or more data streams comprising duplicative data. If reception of the original primary data stream resumes, then the system 100 may resume being configured for redundancy. In the event that reception of the original primary data stream resumes, the redundancy engine and decapsulator 304 may determine whether to identify the original primary data stream as the secondary data stream, and continue to send data from the original secondary data stream to the media buffer 302, or alternatively, to designate the original primary data stream as the primary data stream, re-designate the original secondary data stream back to being the secondary data stream, and send data from the original (and now current) primary data stream to the media buffer. The redundancy engine and decapsulator 304 may be configured to make the determination based on hierarchy and/or priority information that may be the same as or similar to the hierarchy and/or priority information used to initially determine which stream is the primary stream and which stream is the secondary stream.

In the event of a second or subsequent failure or disruption, the redundancy engine and decapsulator 304 may be configured to switch back to the secondary stream, assuming that reception of the primary data stream has resumed and the system is again configured for redundancy. In other systems, there may be more than two duplicate data streams used for redundancy. In such systems, in the event that reception of the initial primary data stream fails, reception of the failed initial primary data stream does not need to resume for the system to be configured for redundancy. For example, if three duplicate data streams are sent over the network 110, the initial primary data stream may fail and the system may maintain redundancy without reception of the initial primary data stream resuming. The data streams originally designated as a secondary data stream and a tertiary data stream may become the primary and secondary data streams accordingly. Should reception of the original primary data stream resume, the redundancy engine and decapsulator 304 may determine how to designate the three data streams based on the hierarchy and/or priority information.

The switch from sending the primary data stream to sending the secondary data stream to the media buffer 302 upon detection of a failure or disruption may be referred to as a failover. The redundancy engine and decapsulator 304 may be configured for lossless failover, in that in the event of a failure or disruption, no data to be processed (e.g., output as audio or video) is lost when performing the failover. To be configured for lossless failover, the redundancy engine and decapsulator 304 may be configured to buffer the secondary data stream. In the event of the failure or disruption in the primary data stream, the data intended to be processed that is unavailable from the primary data stream is available from the secondary data stream by being stored in buffer memory.

To ensure lossless failover, the redundancy engine and decapsulator 304 may be configured to determine which data in the secondary data stream to buffer. To do so, the redundancy engine and decapsulator 304 may not buffer data in the secondary stream in which the corresponding data in the primary data stream is sent to the media buffer 302. That is, the redundancy engine and decapsulator 304 may be configured to buffer data in the secondary data stream in which the corresponding data in the primary stream has not been sent to the media buffer. The redundancy engine and decapsulator 304 may include a tracker or a pointer that keeps track of the sequence number of the primary and secondary data streams. The tracker or pointer may identify the sequence numbers of the data in the primary stream that is sent to the media buffer. The redundancy engine and decapsulator 304 may use the identified sequence numbers to discard and/or ignore the data in the secondary data stream having corresponding sequence numbers. Similarly, the tracker or pointer may identify the sequence numbers of the data in the primary data stream that has not been sent to the media buffer. The redundancy engine and decapsulator 304 may use the identified sequence numbers to buffer the data in the secondary data stream having corresponding sequence numbers.

In alternative redundancy systems, the redundancy engine and decapsulator 304 may not track the data in the primary data stream that is sent to the media buffer 302 and/or may buffer data in the secondary data stream in which the corresponding data in the primary data stream has been sent to the media buffer 302. However, in these alternative systems, buffer allocation memory may not be performed optimally and more buffer memory than is needed may be allocated.

In addition to tracking the data in the primary data stream that is sent to the media buffer 302, the redundancy engine and decapsulator 304 may also be configured to determine an optimal amount of time to buffer the data in the secondary data stream while still ensuring lossless failover before determining that the primary data stream has failed or is disrupted. The optimal amount of time may be based, at least in part, on a timeout period. The timeout period may be a time period between an initial point in time that the redundancy engine and decapsulator 304 determines there may be a failure or a disruption and a subsequent point in time that the redundancy engine and decapsulator 304 determines that the failure or disruption has occurred. The timeout period may be determined because the redundancy engine and decapsulator 304 may not determine the failure or disruption instantly. For example, if the talker 130 transmits data stream packets in the data stream at a predetermined rate, a time that the listener 140 is not receiving data stream packets may be representative of a point in between two times that two packets are received, rather than representative of a failure or disruption. Using that point to identify a failure or disruption may be premature, which may lead to an erroneous identification of the failure or disruption. To avoid an erroneous identification, the timeout period may be established.

The redundancy engine and decapsulator 304 may be configured in various ways to determine the timeout period and determine that the failure or the disruption has occurred based on an expiration of the timeout period. In one way, the timeout period may be a predetermined amount of time from the start of a timer that a packet is not received. The redundancy engine and decapsulator 304 may be configured to start a timer after a data stream packet in the primary is received. The redundancy engine and decapsulator 304 may set the timer to expire after the predetermined amount of time elapses. When the predetermined amount of time elapses, then the redundancy engine and decapsulator 304 may be configured to identify a failure or disruption in the primary data stream. In another way, the redundancy engine and decapsulator 304 may be configured to count or keep track of a number of isochronous cycles that pass without receiving a data stream packet from the primary data stream. An isochronous cycle is a nominal rate at which data stream packets are transmitted. For Stream Reservation (SR) class A networks, the rate is 8 kHz, and for SR class B networks, the rate is 4 kHz. Each time an isochronous cycle passes without receipt of a data stream packet, the redundancy engine and decapsulator 304 increments the number of passed isochronous cycles and compares the number with a predetermined threshold number of passed isochronous cycles. If the number counted meets the threshold number, then the redundancy engine and decapsulator 304 may be configured to determine that the failure or disruption in the primary data stream has occurred. In one example, the predetermined threshold of isochronous cycles may be three, although other numbers may be used. In still another way, the timeout period may be determined by using the secondary data stream as a reference. The redundancy engine and decapsulator 304 may be configured to compare an amount of packets in the secondary data stream that are received without a packet from the primary data stream being received with a predetermined threshold number. If the predetermined threshold number is met, then the redundancy engine and decapsulator 304 may be configured to determine that a failure or disruption has occurred.

The redundancy engine and decapsulator 304 may be configured to use the timeout period to determine an optimal and/or minimal amount of memory to allocate to buffer. Where the primary data stream and the secondary data stream are received by the listener 140 at the same time, the timeout period may be the optimal buffer period. If the redundancy engine and decapsulator 304 identifies that a packet in the primary data stream is not received, then the redundancy engine and decapsulator 304 may be buffer the secondary data stream for the timeout period.

Alternatively, if the primary data stream and the secondary data stream are received at different times (e.g., due to differences in latency between path A and path B as previously described), then, to ensure lossless failover, the timeout period may be offset to determine the optimal amount of time to buffer the secondary data stream. If the primary data stream arrives at the listener 140 before the secondary data stream, then the buffer time may be less than the timeout period. Alternatively, if the primary data stream arrives at listener 140 after the secondary data stream, then the buffer time may be greater than the timeout period. To determine the offset, the redundancy engine and decapsulator 304 may be configured to determine a difference in arrival time between when a packet in the primary data stream arrives at the listener 140 and a corresponding packet in the secondary data stream arrives at the listener 140. In some cases, the redundancy engine and decapsulator 304 may determine an average difference in arrival time over a sample size of packets. The redundancy engine and decapsulator 304 may further be configured to monitor the average difference and/or continuously update the average difference to account for any delay changes in the system. The difference may be the offset.

Based on the difference, the redundancy engine and decapsulator 304 may be configured to determine if the packets in the primary data stream arrive before or after the packets in the secondary data stream arrive, for example by determining if the difference is positive or negative. If the redundancy engine and decapsulator 304 determines that the packets in the primary data stream arrive before the packets in the secondary data stream arrive, then the redundancy engine and decapsulator 304 may be configured to decrease the timeout period by subtracting the difference (i.e. the offset) from the timeout period to determine the optimal amount of buffer time. Alternatively, if the redundancy engine and decapsulator 304 determines that the packets in the primary data stream arrive after the packets in the secondary data stream arrive, then the redundancy engine and decapsulator 304 may be configured to increase timeout period by adding the difference (i.e., the offset) to the timeout period to determine the optimal amount of buffer time.

Before passing the data to the media buffer 302, the redundancy engine and decapsulator 304 may be configured to decapsulate the data. Decapsulating the data may include disassembling each of the data stream packets into individual data samples. In the example listener 140 shown in FIG. 3, the redundancy engine and the decapsulator include a single or unitary component of the listener 140. In other example listeners, the redundancy engine and the decapsulator may be separate components and/or identified as separate components. In some examples, the data stream packets of the primary data stream are decapsulated, and they may not be decapsulated until they are determined to be passed to the media buffer 302. In other examples, the packets of both the primary and secondary data streams are decapsulated, and they are decapsulated before other determinations are made, such as whether to pass the data to the media buffer 302, whether to discard or ignore, or whether to buffer, as examples. Other configurations may be possible.

In some examples, the data from the data stream sent to the media buffer 302 may include raw audio and/or raw video. In other examples, the data stream may be a transport data stream having a compressed format that contains both audio and video. The transport data stream includes transport data stream packets encapsulated in the data stream packets. Where the data stream is a transport data stream, the transport packets, rather than raw audio and/or raw video, are placed in the media buffer 302. Before being placed in the media buffer 302, the redundancy engine and decapsulator 304 may first decapsulate the transport stream packets from the data stream packets in which they were received.

Referring to FIGS. 1-3, the talkers 130, the listener 140, and/or the controllers 150 may be or may include hardware, software, and/or a combination of hardware and software to implement part or all of the functionality of the system 100. One or more of the talker 130, the listener 140, and/or the controllers 150 may be or may include one or more processors, such as one or more central processing unit (CPU), and/or may be in communication with one or more processors, such as a processor of an integrated circuit (e.g., a field programmable gate array (FPGA) or an application specific integrated circuit (ASIC)). More or fewer components may be included in other examples.

One or more of the talker 130, the listener 140, and/or the controller 150 may be connected to each other through or using the network 110. Alternatively or additionally, one or more of the talker 130, the listener 140, and/or the controllers 150 may be connected to each other directly. For example, one or more of the talker 130, the listener 140, and/or the controller 150 may be connected to each other using a wireline such as an Ethernet cable, and/or a wireless network. Various other connections are possible.

The talker 130 may or may not be or include a portion or all of the features of a computer system, such as a computer system 600 shown in FIG. 6 and described later. The talker 130 may be Ethernet AVB enabled and/or compatible. The talker 130 may be configured, adapted, operable, and/or enabled to communicate through and/or with an Ethernet AVB network using one or more standards or protocols. An example of a protocol associated with communications between the talker 130 and the network 110 may be the stream reservation protocol specified in IEEE 802.1Qat-2010. Alternatively or additionally, various other protocols, such as IEEE 802.1ak-2007 Multiple MAC Registration Protocol (“MMRP”), IEEE 802.1AS-2011 (gPTP), IEEE 802.1Qav-2009, and/or IEEE 1722-2011 may be used.

The talker 130 may perform various functions and/or be connected with or include various components. For example, the talker 130 may be connected with the network 110 and an input device, such as a musical instrument or microphone. Information and/or data may be sent to, received by, and/or otherwise be input to the talker 130 or a device connected with the talker 130. For example, a user may play an instrument or sing into a microphone connected with the talker 130 and information and/or data about the instrument, singing, and/or voice may be received by the talker 130.

While the talker 130 in the network communication system 100 may comprise and/or be described as, the physical devices themselves (such as a microphone), it should be appreciated that in some systems, the talker 130 may be or may include a computer or other electronic controlling device, which may be used and/or operated to control the physical device. In these systems, the physical device and the computer or other electronic controlling device may be an electronic system that makes up the talker 130. The computer may include some or all of the features of a computer system 600 shown in FIG. 6 and described later. In these systems, the computer or other electronic controller device may be AVB enabled and/or communicate directly with the network 110. In addition, the computer or other electronic controller device may communicate in various ways with the physical device and/or another device, such as with a wired or wireless connection. Various other alternatives are possible.

The talker 130 may process the information and/or data received in various ways. For example, the talker 130 may be configured to transform any signal received, such as the musical signal, from an analog signal to a digital signal. In other systems, a computing device may perform processing of received information and/or data, and may send the processed information and/or data to the talker 130. Various other processing functions may be performed by the talkers 130 and/or devices in communication with the talker 130.

The listener 140 may or may not be or include a portion or all of the features of a computer system, such as a computer system 600 shown in FIG. 6 and described later. The listener 140 may be Ethernet AVB enabled and/or compatible. The listener 140 may be configured, adapted, operable, and/or enabled to communicate through and/or with an Ethernet AVB network using one or more standards or protocols, such as the stream reservation protocol identified in IEEE 802.1Qat-2010 (SRP), IEEE 802.1Qav-2009, IEEE 802.1AS-2011 (gPTP), and/or IEEE 1722-2011. Alternatively, various other protocols, such as a MMRP, may be used.

The listener 140 may be configured, adapted, and/or operable to receive information that includes data across, through, and/or using the networks 110, 310. For example the listener 140 may be configured and/or adapted to receive a data stream passing across the networks 110, 310 such as an Ethernet AVB network. The information and/or data received by one or more of the listener 140 may be, for example, the information and/or data sent by the talker 130, information and/or data sent by the controller 150, and/or various other information and/or data sent through and/or using the network 110. In some systems, the listener 140 may register for and/or receive a data stream from the talker 130. Registration for and/or receipt of a data stream may or may not be received by the listener 140 with a guaranteed bandwidth. Various other possibilities exist.

The listener 140 may perform various functions and/or include or be connected with various components. For example, the listener 140 may be connected with the network 110 and an output device, such as a speaker or television monitor. Information and/or data may be gathered and/or otherwise received by the listener 140 through the network 110. For example, information and/or data about notes played on a musical instrument may be transmitted by the talker 130 through the network 110 and/or be received by the listener 140. The listener 140 may process the information and/or data received through the network 110. In addition, the listener 140 may output processed information and/or data to the speaker. For example, the listener 140 may output information and/or data related to the signal received through the network 110 to the speaker.

While the listener 140 in the network communication system 100 may comprise and/or be described as physical devices (such as a speaker), it should be appreciated that in some systems, the listener 140 may be or may include a computer or other electronic controlling device which may be used and/or be operated to control the listener 140 (such as a speaker). The computer or other electronic controller device may have some or all of the features of a computer system 600 shown in FIG. 6 and described later. In these systems, the computer or other electronic controller device may be AVB enabled and/or communicate directly with the network 110. In these systems, the computer or other electronic controller device may communicate with the physical device and/or a different device in various ways, such as with a standard wired or wireless connection. Various other alternatives are possible.

The controllers 150 may or may not be or include a portion or all of the features of a computer system, such as a computer system 600 shown in FIG. 6 and described later. The controller 150 may be Ethernet AVB enabled and/or compatible. The controller 150 may be configured, adapted, operable, and/or enabled to communicate with and/or through an Ethernet AVB network, such as according to, through, and/or with a one or more standards or protocols, such as the stream reservation protocol outlined in IEEE 802.1Qat-2010. Alternatively, various other protocols, such as a MMRP, may be used.

The controller 150 may be or comprise a high-level application of an electronic device that is configured to communicate directly or indirectly with the talker 130 and/or the listener 140. The controller 150 may be configured to manage and/or control a connection of a data stream between two or more devices, such as between the talker 130 and the listener 140. The controller 150 may be part of an electronic device or in communication with an electronic device that desires to establish and/or tear down a data stream between two devices. As an example, the controller 150 may be or may be in communication with a remote control. The remote control may be configured to issue a command, such as a "Play" command to the controller 150 which may instruct the controller 150 to establish a connection between the talker 130 and the listener 140.

FIG. 1 shows the controller 150 as an electronic device of the system 100 that is separate from the talker 130 and the listener 140. In other example network communication systems, the controller 150 may be a component of one or more of the other electronic devices in the system 100, including the talker 130 and/or the listener 140. The components may be high-level applications of the other electronic devices. Where the controller 150 is a component of the other electronic devices, the controller 150 may be configured to communicate with one or more components of the other electronic devices that are configured to perform the roles of the talker and/or the listener. Further, the controller 150 may be configured to communicate with other devices for which the controller 150 are not components over the network 110 and/or through wired or wireless non-network connections. As an example, where the controller 150 is a component of the talker 130, the controller 150 may be configured to communicate with one or more components of the talker 130 that are configured to perform the role of the talker. Similarly, if the controller 150 is a component of the listener 140, the controller 150 may be configured to communicate with the one or more components of the listener 140 that are configured to perform the role of the listener.

Each of the electronic devices in the example network communications system 100 may include and/or be in communication with memory that may be used to store information and/or data, including latency information and/or information included in the listener latency messages, latency requests, stream latency messages, stream advertisements, replies to stream advertisements, and/or data streams, as examples. The memory may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory may include a cache or random access memory for a processor, such as processor 602 of computer system 600 described later. In alternative examples, the memory is separate from a processor, such as a cache memory of a processor, the system memory, or other memory. The memory may be an external storage device or database for storing data. Examples include a hard drive, compact disc ("CD"), digital video disc ("DVD"), memory card, memory stick, floppy disc, universal serial bus ("USB") memory device, or any other device operative to store data. The memory may be operable to store instructions executable by a processor. The functions, acts or tasks illustrated in the figures or described may be performed by a programmed processor executing the instructions stored in the memory. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

In some systems, the memory may be a separate and/or collective memory or database. The separate and/or collective memory or database may represent one database for both the electronic devices in the example network communication system 100, including the talker 130, the listener 140, and/or the controller 150. The separate and/or collective memory or database may be continuously updated, or updated at various other intervals. In some systems, the separate and/or collective memory or database may collect and/or update information based on information and/or data about the application-layer messages and/or the data streams received and/or stored in the memory. Updates may be sent by the separate and/or collective memory or database to the memory at various intervals, such as every 10-15 seconds. In these systems, the memory may be the same.

In an alternative example, the memory may not be included in the example network communication system 100, including the talker 130, the listener 140, and/or the controller 150. Rather, the memory may be included separately and/or be in communication with the electronic devices in the network communication system 100. In another alternative example system, parts of a separate and/or collective memory or database may be extracted from an external database and stored in volatile memory in one or more of the electronic devices in the network communication system 100 when one or more of the electronic devices in the network communication system 100 are powered up. Various other examples, functions and/or features of the memory are possible.

The electronic devices of the example network communication systems 100, including the talker 130, the listener 140, and/or the controller 150, may comprise one or more hardware and/or software based components or modules that are configured to perform the roles of the talker, the listener, and/or the controller. The components or modules may comprise computer instructions, computer code, digital logic, other software, hardware, or any combination thereof a part of which may be stored in the memory and/or any other storage device internal or external to the talker 130 the listener 140, and/or the controller 150 and that is executable by one or more processors.

Figure 4:
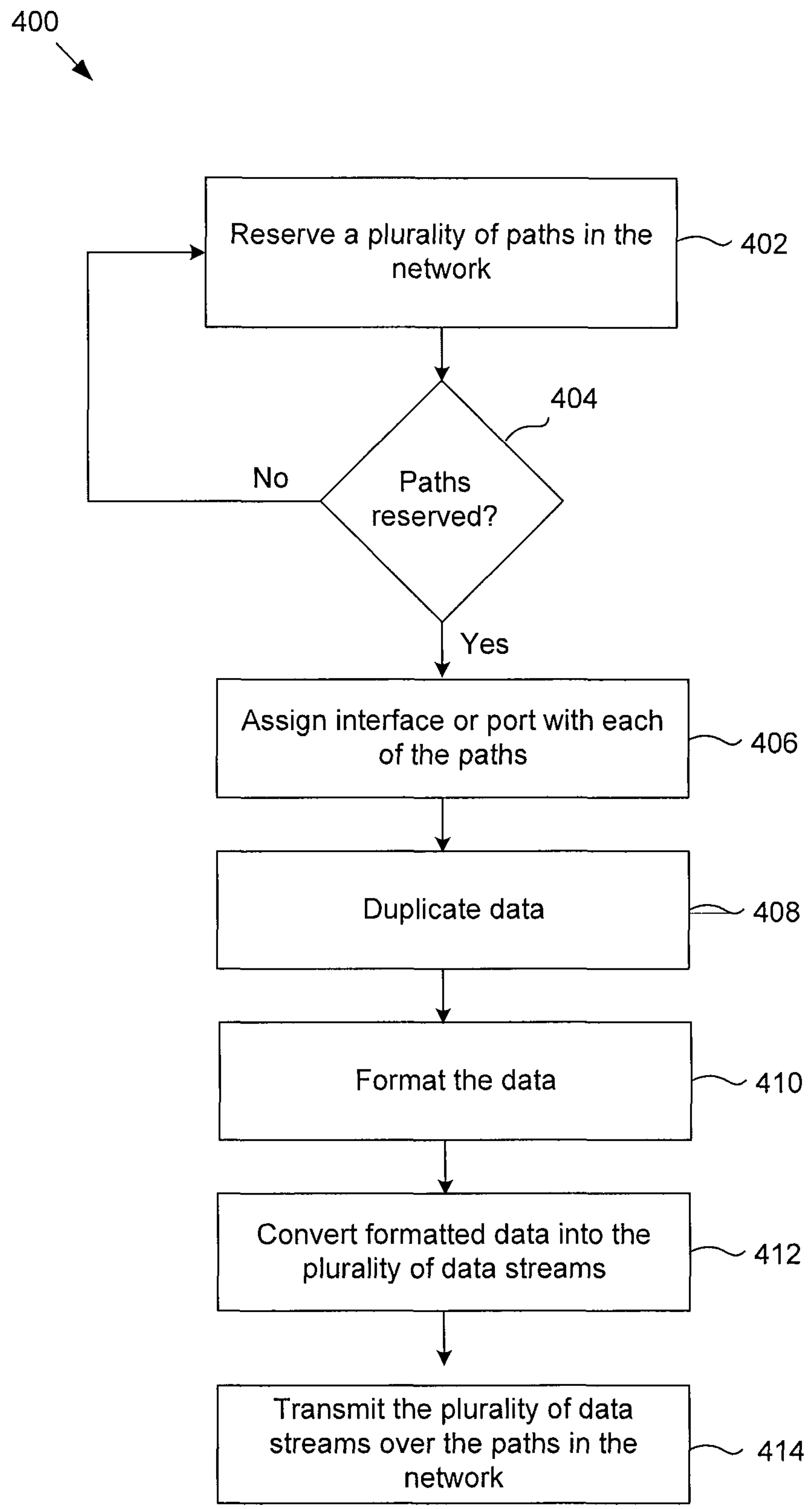
FIG. 4 is a flow diagram of an example method of transmitting a plurality of data streams over a plurality of reserved paths in a network for redundancy.

FIG. 4 shows a flow diagram of an example method 400 of reserving a plurality of network paths and generating a plurality of data streams for transmission across the paths in a network communication system configured for redundancy. At block 402, a talker may reserve a plurality of paths over a network in the communication system over which to transmit a plurality of data streams to a talker. To reserve the paths, the talker may send a plurality of stream advertisements. In one example, two stream advertisements are sent to reserve two paths for two data streams. Each of the stream advertisements may include a unique and/or different stream ID, each corresponding to one of the plurality of data streams. The talker may correlate or couple the stream IDs so that they are used for and/or associated with duplicate data streams for redundancy (i.e., a primary and one or more non-primary streams). The talker may receive one or more responses to the stream advertisements from a listener. For example, the talker may receive two responses, one corresponding to each stream advertisement. Alternatively, the talker may receive a single response, indicating that the listener wants to listen to both streams. In response to receiving the one or more response from the listener, the talker may be configured to establish the plurality of paths. At block 404, the talker may determine whether all of the paths are reserved and/or established. If all of the paths are not reserved and/or established, then the method may go back to block 402 where the talker performs actions necessary to reserve the plurality of paths. For example, the talker may wait to receive more responses from the listener or may try sending stream advertisements again to reserve the paths. Alternatively, if all of the paths are reserved, then at block 406, the talker may be configured to assign an interface or a port with each of the paths, as previously described.

At block 408, the talker may receive or generate the data to be included in an original or first data stream, and may duplicate the data to be included in a duplicated or second data stream. Alternatively, the talker may receive both the original data and the duplicated data and block 408 may be omitted. At block 410, the talker may packetize the original and duplicate data into packets, or otherwise format the data in a format suitable for transmission over the network. At block 412, the talker may convert the packets of original data and packets of duplicate data into the plurality of data streams. The talker may also assign stream IDs to the plurality of data streams. The stream IDs may be unique, with each data stream being assigned a different stream ID. The streams IDs assigned to the data streams may be the same and/or correspond to the stream IDs used to reserve the paths. At block 414, the talker may transmit the plurality of data streams over the network using the plurality of interfaces, each interface connected to a different path.

Figure 5:
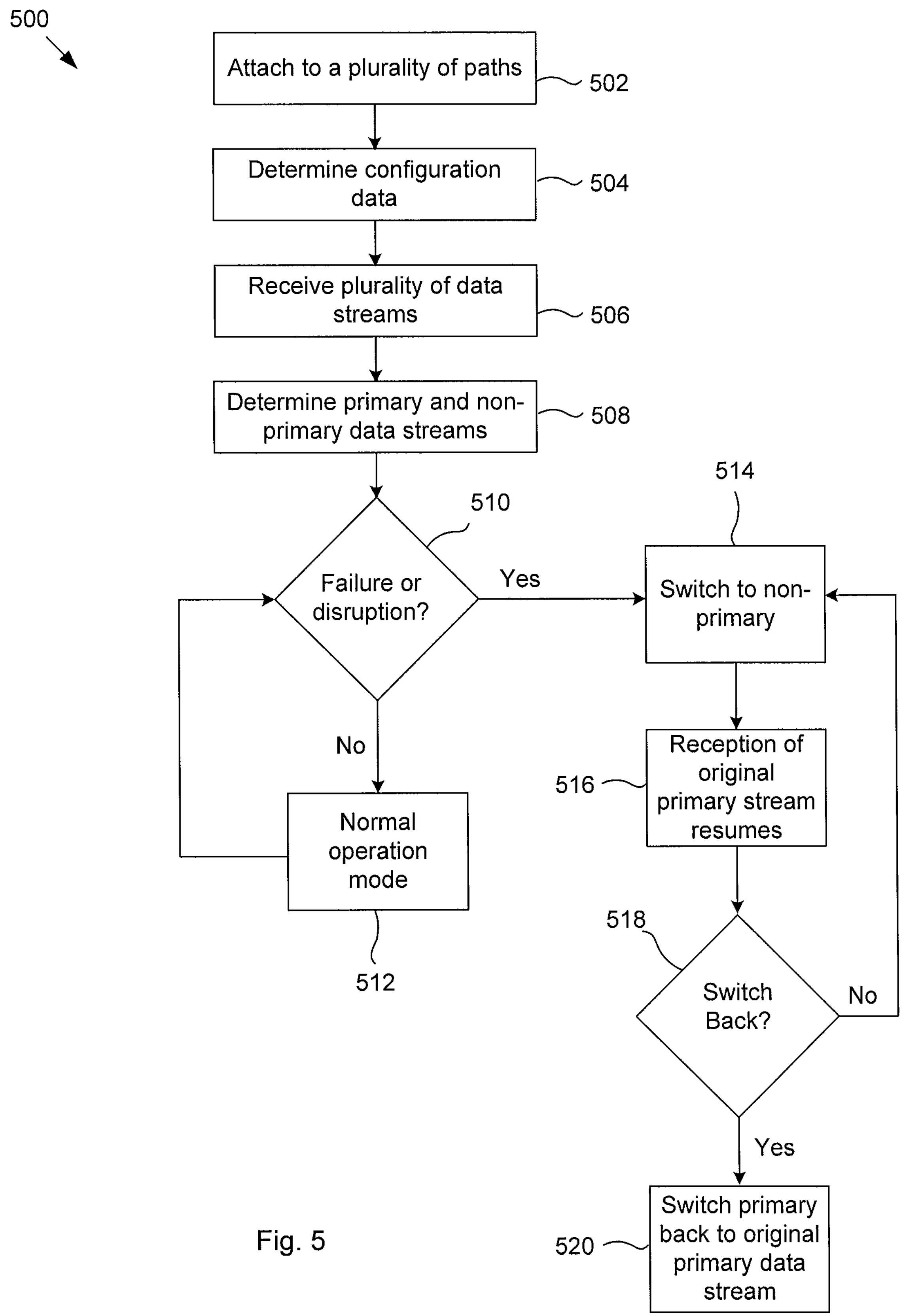
FIG. 5 is a flow diagram of an example method of managing a plurality of received data streams for lossless failover.

FIG. 5 shows a flow diagram of an example method 500 of managing a plurality of received duplicate data streams for lossless failover by a listener in a network communication system. At block 502, the listener attaches to a plurality of paths used to transmit the plurality of duplicate data streams. The listener may attach to the paths by responding to a plurality of stream advertisements sent to advertise the data streams. The listener may record or store stream IDs included in the stream advertisements for use in determining whether to filter through the later-received data streams. The listener may also assign and/or determine which ports and/or interfaces attach to which paths and receives which data streams.

At block 504, the listener may determine configuration data that may be used to manage the received data streams for redundancy. The configuration data may include hierarchy and/or priority information used to determine a primary data stream and one or more non-primary data streams (e.g., secondary data streams) among the plurality of received data streams. The configuration data may also include timeout period information, such as predetermined threshold used to determine the timeout period and/or when the timeout period starts or expires. Some or all of the configuration data may be determined before or after the listener attaches to the plurality of paths at block 502. For example, the listener may be configured to know the information to determine the timeout period before responding to any stream advertisements, but may not be able to determine hierarchy and/or priority information until the paths (including latency information in the paths) are known.

At block 506, the listener may receive the plurality of data streams and filter out any data streams having stream IDs that do not match known stream IDs stored in a list or look up table that are acceptable and/or desired by the listener for processing.

At block 508, the listener determines, among the accepted data stream packets, the data stream packets associated with the primary data stream and the data stream packets associated with one or more non-primary data streams. At block 510, the listener determines whether there is a failure or disruption in the reception of the primary data stream. If the listener determines that there is not a failure or disruption, then at block 512, the listener operates in a normal operation mode. In the normal operation mode, the listener sends data from the primary data stream to a media buffer to be processed (e.g., output as audio and/or video), and ignores or discards data in the secondary data stream that corresponds to the data in the primary data stream that is sent to the media buffer. Also, in the normal operation mode, the listener may buffer data in the secondary data stream for a determined optimal amount of time, as previously described. While in the normal operation mode, the process may go back to block 512, where the listener determines if a failure or disruption in receiving the primary data stream. As long as the listener continues receiving packets from the primary data stream within the timeout period, the listener remains in normal operation mode. However, if at block 510, the timeout period elapses, the listener may determine that a failure or disruption has occurred, and the method may proceed to block 514. At block 514, the listener may switch over to sending the data in the secondary stream to the media buffer. The data in the secondary data stream sent to the media buffer may include data that was buffered for the optimal amount of time. At block 514, the listener may switch over so that no data sent from the talker to be processed is lost. At block 516, which in some systems may not occur, reception of the original primary data stream resumes and the system is again configured for redundancy. At block 518, the listener determines whether to switch back to the original primary data stream being the current primary data stream. If the listener does not determine to switch back, then the method goes to back to block 514, where the listener continues to send data from the original secondary stream to the media. However, if at block 518, the listener determines to switch back, then at block 520, the original primary data stream is again designated as the primary data stream and the original non-primary data stream goes back to being a non-primary data stream.

Figure 6:
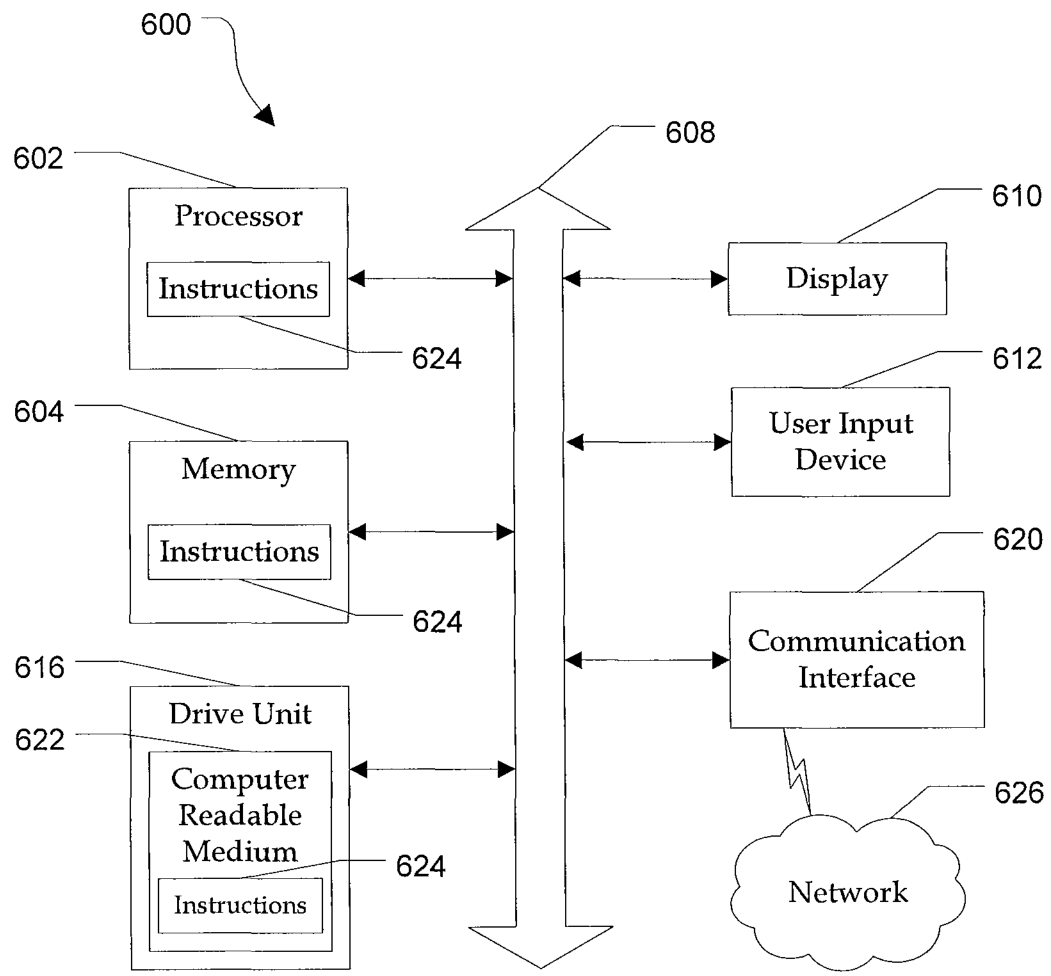
FIG. 6 is an example of a computer processing system for use with one or more components in the network communication system.

One or more of the talker 130, the listener 140, and/or the controller 150 shown in FIGS. 1, 2, and/or 3 may be and/or may include a portion or all of one or more computing devices of various kinds, such as the computing device in FIG. 6. FIG. 6 illustrates an example of a general computer system designated 600. Any of the components shown in FIGS. 1, 2, and/or 3 may include a portion or all of the computer system 600. For example, in some examples, the computer system 600 may include only a processor and memory. The computer system 600 can include a set of instructions that can be executed to cause the computer system 600 to perform any one or more of the methods or computer based functions disclosed. The computer system 600 may operate as a standalone device or may be connected, e.g., using a network, to other computer systems or peripheral devices.

In a networked deployment, the computer system 600 may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular example, the computer system 600 can be implemented using electronic devices that provide voice, audio, video or data communication. Further, while a single computer system 600 is illustrated, the term "system" shall also be taken to include any collection of systems or sub-systems that individually or jointly execute a set, or multiple sets, of instructions to perform one or more computer functions.

In FIG. 6, the example computer system 600 may include a processor 602, e.g., a central processing unit (CPU), a graphics processing unit (GPU), or both. The processor 602 may be a component in a variety of systems. For example, the processor 602 may be part of a standard personal computer or a workstation. The processor 602 may be one or more general processors, digital signal processors, application specific integrated circuits, field programmable gate arrays, servers, networks, digital circuits, analog circuits, combinations thereof, or other now known or later developed devices for analyzing and processing data. The processor 602 may implement a software program, such as code generated manually (i.e., programmed).

The term "module" may be defined to include a plurality of executable modules. As described herein, the modules are defined to include software, hardware or some combination thereof executable by a processor, such as processor 602. Software modules may include instructions stored in memory, such as memory 604, or another memory device, that are executable by the processor 602 or other processor. Hardware modules may include various devices, components, circuits, gates, circuit boards, and the like that are executable, directed, and/or controlled for performance by the processor 602.

The computer system 600 may include a memory 604, such as a memory 604 that can communicate via a bus 608. The memory 604 may be a main memory, a static memory, or a dynamic memory. The memory 604 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 604 includes a cache or random access memory for the processor 602. In alternative examples, the memory 604 is separate from the processor 602, such as a cache memory of a processor, the system memory, or other memory. The memory 604 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 604 is operable to store instructions executable by the processor 602. The functions, acts or tasks illustrated in the figures or described may be performed by the programmed processor 602 executing the instructions stored in the memory 604. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 600 may or may not further include a display unit 610, such as a liquid crystal display (LCD), an organic light emitting diode (OLED), a flat panel display, a solid state display, a cathode ray tube (CRT), a projector, a printer or other now known or later developed display device for outputting determined information. The display 610 may act as an interface for the user to see the functioning of the processor 602, or specifically as an interface with the software stored in the memory 604 or in the drive unit 616.

Additionally, the computer system 600 may include an input device 612 configured to allow a user to interact with any of the components of system 600. The input device 612 may be a number pad, a keyboard, or a cursor control device, such as a mouse, or a joystick, touch screen display, remote control or any other device operative to interact with the computer system 600.

In a particular example, as depicted in FIG. 6, the computer system 600 may also include a disk or optical drive unit 616. The disk drive unit 616 may include a is computer-readable medium 622 in which one or more sets of instructions 624, e.g. software, can be embedded. Further, the instructions 624 may embody one or more of the methods or logic as described. In a particular example, the instructions 624 may reside completely, or at least partially, within the memory 604 and/or within the processor 602 during execution by the computer system 600. The memory 604 and the processor 602 also may include computer-readable media as discussed above.

The present disclosure contemplates a computer-readable medium that includes instructions 624 or receives and executes instructions 624 responsive to a propagated signal so that a device connected to a network 626 can communicate voice, video, audio, images or any other data over the network 626. Further, the instructions 624 may be transmitted or received over the network 626 via a communication port or interface 620, and/or using a bus 608. The communication port or interface 620 may be a part of the processor 602 or may be a separate component. The communication port 620 may be created in software or may be a physical connection in hardware. The communication port 620 may be configured to connect with a network 626, external media, the display 610, or any other components in system 600, or combinations thereof. The connection with the network 626 may be a physical connection, such as a wired Ethernet connection or may be established wirelessly as discussed later. Likewise, the additional connections with other components of the system 600 may be physical connections or may be established wirelessly. The network 626 may alternatively be directly connected to the bus 608.

The network 626 may include wired networks, wireless networks, Ethernet AVB networks, or combinations thereof. The wireless network may be a cellular telephone network, an 802.11, 802.16, 802.20, 802.1Q or WiMax network. Further, the network 626 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed. The "computer-readable medium" may be non-transitory, and may be tangible.

In an example, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative example, dedicated hardware implementations, such as application specific integrated circuits, programmable logic arrays and other hardware devices, may be constructed to implement various modules or parts of modules included in the system. Applications that may include the apparatus and systems may broadly include a variety of electronic and computer systems. One or more examples described may implement functions using two or more specific interconnected hardware modules or devices with related control and data signals that can be communicated between and through the modules, or as portions of an application-specific integrated circuit. Accordingly, the present system encompasses software, firmware, and hardware implementations.

The system described may be implemented by software programs executable by a computer system. Further, in a non-limited example, implementations may include distributed processing, component/object distributed processing, and parallel processing. Alternatively, virtual computer system processing, such as cloud computing, may be constructed to implement various parts of the system.

The system is not limited to operation with any particular standards and protocols. For example, standards for Internet and other packet switched network transmission (e.g., TCP/IP, UDP/IP, HTML, HTTP) may be used. Such standards are periodically superseded by faster or more efficient equivalents having essentially the same functions. Accordingly, replacement standards and protocols having the same or similar functions as those disclosed are considered equivalents thereof.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A method of managing a plurality of data streams in a network communication system for lossless failover, the method comprising:

receiving a plurality of data streams over a network, the data streams having matching data;

identifying, with at least one processor, one of the plurality of data streams as a primary data stream and at least one of the other of the plurality of data streams as a non-primary data stream;

determining, with the at least one processor, an amount of time to buffer the non-primary data stream for lossless failover, where the amount of time to buffer the non-primary data is based on a difference in arrival times between the primary data stream and the non-primary data stream and where the amount of time to buffer the non-primary data is dynamically adjusted based on monitored network conditions to update an average difference in arrival times as the average difference in arrival times changes due to delay changes in the network communication system; and buffering, with the at least one processor, at least a portion of the non-primary data stream for the amount of time.

2. The method of claim 1, where the amount of time to buffer the non-primary data stream is based further on a timeout period, where an elapse of the timeout period indicates a failure or disruption in reception of the primary data stream.

3. The method of claim 2, further comprising:

determining, with the at least one processor, that the failure or disruption in reception of the primary data stream has occurred; and processing, with the at least one processor, data from the non-primary data stream in response to determining that the failure or disruption has occurred.

4. The method of claim 3, further comprising:

sending at least a portion of the buffered non-primary data stream to a media buffer in response to determining with the at least one processor that the failure or disruption in the reception of the primary data stream has occurred.

5. The method of claim 2, further comprising:

determining, with the at least one processor, that the timeout period has elapsed; and where determining that the failure or disruption has occurred comprises determining, with the at least one processor, that the failure or disruption in reception of the primary data stream has occurred in response to determining that the timeout period has elapsed.

6. The method of claim 2, where the timeout period is based on one of:

a predetermined amount of time that data in the primary data stream is not received;

a predetermined number of isochronous cycles over which data in the primary data stream is not received; and a predetermined amount of data in the non-primary data stream that is received without data in the primary data stream being received.

7. The method of claim 1, further comprising:

tracking, with the at least one processor, packets of the primary data stream that are sent to a media buffer; and determining whether to discard or ignore data in the non-primary data stream based on the tracked packets.

8. The method of claim 1, where identifying, with the at least one processor, the one of the plurality of data streams as the primary data stream and the at least one of the other of the plurality of data streams as the non-primary data stream comprises:

identifying, with the at least one processor, the one of the plurality of data streams as the primary data stream and the at least one of the other of the plurality of data streams as the non-primary data stream based on determining a designation of the data streams that yields an optimal amount of memory buffering.

9. The method of claim 1, where identifying, with the at least one processor, the one of the plurality of data streams as the primary data stream and the at least one of the other of the plurality of data streams as the non-primary data stream comprises:

identifying, with the at least one processor, the one of the plurality of data streams as the primary data stream and the at least one of the other of the plurality of data streams as the non-primary data stream based on failure statistics.

10. The method of claim 5, further comprising offsetting the timeout period by the difference in arrival time between the primary data stream and the non-primary data stream, and where the amount of time to buffer the non-primary data stream is the offset timeout period.

11. A listener configured to receive a plurality of data streams over a network, the listener comprising:

a network interface in communication with the network, the network interface configured to receive the plurality of data streams;

at least one processor in communication with the network interface, the at least one processor configured to:

receive, via the network interface, data stream packets from the plurality of data streams;

identify each of the data stream packets as a data stream packet associated with a primary data stream or a non-primary data stream, the primary data stream being transmitted via a first communication path in the network and the non-primary data stream being transmitted via a second, different communication path, at least one path of the first communication path and the second communication path including one or more different intermediate network devices than the other path;

determine an amount of time to buffer the data stream packets associated with the non-primary data stream where the amount of time to buffer the data packets associated with the non-primary data stream is an offset timeout period, the offset timeout period being a timeout period that is offset by the difference in arrival time between the primary data stream and the non-primary data stream, and where an elapse of the timeout period indicates a failure or disruption in reception of the primary data stream; and a buffer memory in communication with the at least one processor, the buffer memory being configured to buffer the data stream packets associated with the non-primary data stream, for the determined amount of time.

12. The listener of claim 11, where the at least one processor is further configured to:

determine whether the timeout period has elapsed;

identify whether the failure or disruption in reception of the primary data stream has occurred in response to determining whether the timeout period has elapsed;

send at least a portion of the data stream packets associated with the primary data stream or at least a portion of the data stream packets associated with the non-primary data stream in response to identification of whether the failure or disruption in reception of the primary data stream has occurred.

13. The listener of claim 12, where the at least one processor is configured to:

send at least a portion of the data stream packets associated with the primary data stream to a media buffer in response to identification that no failure or disruption in reception of the primary data stream has occurred, and send at least a portion of the data stream packets associated with the non-primary data stream to the media buffer in response to identification that the failure or disruption in reception of the primary data stream has occurred.

14. The listener of claim 11, wherein the at least one processor is further configured to:

track packets associated with the primary data stream that are sent to a media buffer; and determine whether to discard or ignore data stream packets associated with the non-primary data stream based on the tracked packets.

15. A network communication system comprising:

a listener comprising:

a network interface in communication with a communication network, where the network interface is configured to receive, from a talker over the network, a first data stream over a first reserved path in the communication network and a second data stream over a second reserved path in the communication network, the second data stream being a duplicate of the first data stream;

a buffer memory; and a processor in communication with the network interface and the buffer memory, the processor configured to:

identify the first data stream as a primary data stream and the second data stream as a secondary data stream;

set a timeout period, an elapse of the timeout period indicative of a failure or disruption in reception of the primary data stream;

offsetting the timeout period by a difference in arrival time between the primary data stream and the non-primary data stream;

determine an amount of time to buffer packets of the secondary data stream in the buffer memory based on the timeout period as offset by the difference in arrival times between the primary data stream and the secondary data stream;

determine whether a failure or disruption in reception of the primary data stream has occurred; and process either the primary data stream or the secondary data stream based on the determination of whether the failure or disruption in the primary data stream has occurred.

16. One or more non-transitory computer readable storage media encoded with software comprising computer executable instructions executable with a processor to:

identify one of a plurality of data streams as a primary data stream and at least one other of the plurality of data streams as a non-primary data stream, the primary data stream being identical to the non-primary data stream and received from a first communication path having at least one different network device than a second communication path, the non-primary data stream being received from the second communication path;

determine an amount of time to buffer the non-primary data stream for lossless failover, the amount of time determined is based on a difference in arrival times between the primary data stream and the non-primary data stream, and the amount of time to buffer the non-primary data stream is updated dynamically based on monitored network conditions to update an average difference in arrival times as the average difference changes due to delay changes in a network communication system; and buffer at least a portion of the non-primary data stream for the determined amount of time.

17. The one or more non-transitory computer-readable storage media of claim 16, further comprising software comprising computer executable instructions executable with a processor to:

determine a failure or disruption in reception of the primary data stream; and switch from sending to a media buffer the primary data stream to sending to the media buffer the secondary data stream in response to determining the failure or disruption in the reception of the primary data stream.

* * * * *